United States Patent
McDonough et al.

(10) Patent No.: US 6,539,049 B1
(45) Date of Patent: Mar. 25, 2003

(54) DEVICE AND METHOD FOR MAINTAINING TIME SYNCHRONOUS WITH A NETWORK MASTER TIME

(75) Inventors: John G. McDonough, La Jolla, CA (US); Tien Q. Nguyen, San Diego, CA (US); David (Daching) Chen, Irvine, CA (US)

(73) Assignees: Dot Wireless, Inc., San Diego, CA (US); VLSI Technology, Inc., San Jose, CA (US)

( * ) Notice: Subject to any disclaimer, the term of this patent is extended or adjusted under 35 U.S.C. 154(b) by 0 days.

(21) Appl. No.: 09/322,240

(22) Filed: May 28, 1999

(51) Int. Cl.[7] ............................................... H04B 1/707
(52) U.S. Cl. ..................................................... 375/145
(58) Field of Search ................................ 375/141, 144, 375/145, 148, 149, 367; 370/320, 335, 342, 441

(56) References Cited

U.S. PATENT DOCUMENTS

| | | | |
|---|---|---|---|
| 3,746,847 A | 7/1973 | Maritsas | 235/152 |
| 4,493,046 A | 1/1985 | Watanabe | 364/717 |
| 4,817,148 A | 3/1989 | Lafferty et al. | 380/48 |
| 5,007,088 A | 4/1991 | Ooi et al. | 380/46 |
| 5,103,459 A | 4/1992 | Gilhousen et al. | 375/1 |
| 5,228,054 A | 7/1993 | Rueth et al. | 375/1 |
| 5,311,176 A | 5/1994 | Gurney | 341/50 |
| 5,337,338 A | 8/1994 | Sutton et al. | 337/333 |
| 5,428,820 A | 6/1995 | Okada et al. | 455/38.3 |
| 5,499,280 A | 3/1996 | Wilson et al. | 377/108 |
| 5,532,695 A | 7/1996 | Park et al. | 341/173 |
| 5,878,075 A | 3/1999 | Frank et al. | 375/200 |
| 5,883,889 A | 3/1999 | Faruque | 370/335 |
| 5,966,667 A * | 10/1999 | Halloran et al. | 455/552 |
| 6,289,067 B1 * | 9/2001 | Nguyen et al. | 375/372 |
| 6,374,078 B1 * | 4/2002 | Williams et al. | 455/7 |

OTHER PUBLICATIONS

AK2481 / CDMA / J(N)–TACS / AMPS ABP—Data Sheet, Asahi Kasei Microsystems Co., Ltd., pp. 1–96 (date undetermined).

* cited by examiner

*Primary Examiner*—Don N. Vo
(74) *Attorney, Agent, or Firm*—Pedro P. Hernandez; W. James Brady, III; Frederick J. Telecky, Jr.

(57) ABSTRACT

An integrated circuit device includes a clock generator having a primary input for coupling to a primary reference frequency source, a secondary input for coupling to a secondary reference frequency source, and an output that produces a primary digital transceiver clock signal having a frequency of chiprate (S)(n) in a primary mode, and a secondiary digital transceiver clock signal having a frequency of chiprate in a secondary power saving mode. A chiprate divider connected to the output of the clock generator produces a primary mode enable signal that has a frequency of chiprate when in a primary mode. A long PN generator and a short PN generator each have a clock input that is coupled to the output of the clock generator. A first multiplexer output produces the primary mode enable signal in a primary mode, and the secondary mode enable signal in a secondary mode. A clock calibrator measures the frequency difference between 1/(S)(n) times the frequency of the primary digital transceiver clock signal and the frequency of the secondary digital transceiver clock signal as a function of time. A secondary mode timer indicates the amount of time the secondary mode is in effect. A controller calculates the cumulative resluting frequency error, and produces a signal for advancing or retarding a master timer to reduce the frequency error between the long PN generator and the short PN generator on the one hand, and the CDMA network time on the other hand.

86 Claims, 7 Drawing Sheets

DEVICE AND METHOD FOR MAINTAINING TIME SYNCHRONOUS WITH A NETWORK MASTER TIME

CROSS-REFERENCE TO RELATED APPLICATIONS

The following applications, assigned to the assignee of the current invention, are being filed concurrently, contain material related to the subject matter of this application, and are incorporated herein by reference:

by J. McDonough, entitled "Method of and Apparatus for Generating Data Sequences for Use in Communications," Ser. No. 09/322,373;

by D. Chen et al., entitled "Device and Method for Generating Clock Signals From a Single Reference Frequency Signal and for Synchronizing Data Signals with a Generated Clock," Ser. No. 09/322,282;

by E. Park, entitled "Pulse Density Modulator with Improved Pulse Distribution," Serial No. 09/322,539;

by J. McDonough et al., entitled "Method and Apparatus for Controlling System Timing with Use of a Master Timer," Ser. No. 09/321,697.

BACKGROUND OF THE INVENTION

1. Field of the Invention

The invention relates to maintaining time synchronous with a network master time. More particularly, the invention concerns generating a clock signal for maintaining synchronism with network time in a primary mode and in a powersaving secondary mode.

2. Description of the Related Art

Code division multiple access (CDMA) cellular radiotelephone networks are a widely used type of spread spectrum communication system. Frequently, mobile telephones are small handheld units operating from battery power. Consequently, power conservation is a constant goal of handheld radiotelephone designers. A well known technique for saving power entails reducing the clock rate, or completely cutting off the clock, supplied to components of the radiotelephone that are not needed for the present mode of operation of the telephone. When the clock to selected components is reduced or eliminated, the telephone is in what is referred to as a secondary mode of operation.

For a CDMA radio telephone system to operate correctly, it is necessary for the radiotelephone to have a master timer that establishes and maintains synchronism with a CDMA network timer. To enable the radiotelephone to resume communications with a base station quickly and without using an excessive amount of power after leaving the secondary mode, the radiotelephone must maintain synchronism with the network timer even when the radiotelephone is in the secondary mode.

Typically, a radiotelephone has an analog transceiver that is commonly left operating when the radiotelephone is in the secondary mode, because the radiotelephone provides timing signals. However, leaving the analog transceiver operating during the secondary mode increases power consumption during the secondary mode due to the power consumption of the analog transceiver.

Consequently, there is a need for a way to maintain CDMA network time in a radiotelephone while the radiotelephone is in the secondary mode, without running the analog transceiver. Additionally, it would be desirable to clock a digital transceiver in a radiotelephone at a frequency higher than the commonly used frequency of chiprate(8), in order to allow for more efficient useage of digital transceiver resources through timesharing.

SUMMARY OF THE INVENTION

An illustrative embodiment of the invention is an integrated circuit device having a clock generator. The clock generator has a primary input for coupling to a primary reference frequency source, a secondary input for coupling to a secondary reference frequency source, and an output that produces a primary digital transceiver clock signal having a frequency of chiprate $(S)(n)$ in a primary mode, and that produces a secondary digital transceiver clock signal having a frequency of chiprate in a secondary power saving mode. Preferably, the primary reference frequency source is a voltage controlled, temperature compensated crystal oscillator (VCTCXO), and the secondary reference frequency source is a crystal/oscillator (meaning that it can be a crystal or an oscillator). The device also includes a chiprate divider having an input that is coupled to the output of the clock generator. An output of the chiprate divider produces a primary mode enable signal that has a frequency of chiprate when in a primary mode. The device also includes a long PN generator and a short PN generator. A clock input of the long PN generator and a clock input of the short PN generator are coupled to the output of the clock generator. The device also includes a first multiplexer that has a first input coupled to the output of the chiprate divider, and a second input coupled to an output providing a secondary mode enable signal, and an output coupled to an enable input of the long PN generator and to an enable input of the short PN generator. The device also includes a controller that has a control output coupled to a control input of the first multiplexer. The controller produces a first control signal at the control output for producing the primary mode enable signal at the output of the first multiplexer in a primary mode, and the controller produces a second control signal at the control output for producing a secondary mode enable signal at the output of the first multiplexer in a secondary mode. The control signal may be a single signal that is used to select between the primary mode and the secondary mode.

The clock generator includes a primary digital transceiver clock generator having an output producing the primary digital transceiver clock signal, and an alternate source divider having an output producing the secondary digital transceiver clock signal. The clock generator also includes a multiplexer having an output that produces the primary digital transceiver clock signal when the multiplexer receives the first control signal from the controller, and that produces the secondary digital transceiver clock signal when the multiplexer receives the second control signal from the controller.

The device also includes a clock calibrator for measuring the frequency difference between $1/(S)(n)$ times the frequency of the primary digital transceiver clock signal and the frequency of the secondary digital transceiver clock signal as a function of time. The device also includes a secondary mode timer that produces a signal indicating the amount of time that the secondary mode is in effect. The controller has a calibrator input coupled to the output of the clock calibrator, and timer input coupled to the output of the secondary mode timeR. The controller is configured to calculate the cumulative frequency error during the time that the secondary mode is in effect. The controller also includes a master timer adjustment output that produces a signal for advancing or retarding a master timer to reduce the frequency error between the long PN generator and the short PN generator on the one hand, and the CDMA network time on the other hand. The device also includes a master timer having an input coupled to a master timer adjustment output of the controller.

The invention can also be implemented as a radiotelephone and as a method. The invention advantageously provides for generation of a primary digital transceiver clock signal having a frequency that is higher than commonly used digital transceiver clock signals, to allow for more efficient usage of digital transceiver resources through timesharing. The invention also provides for maintaining CDMA network time without operating an analog transceiver during the secondary mode, thereby reducing power consumption during the secondary mode. Additional advantages and benefits of the invention will be apparent from the following description.

DETAILED DESCRIPTION OF THE PREFERRED EMBODIMENTS

Hardware Components and Interconnections

A. Integrated Circuit Device

Figure 1:
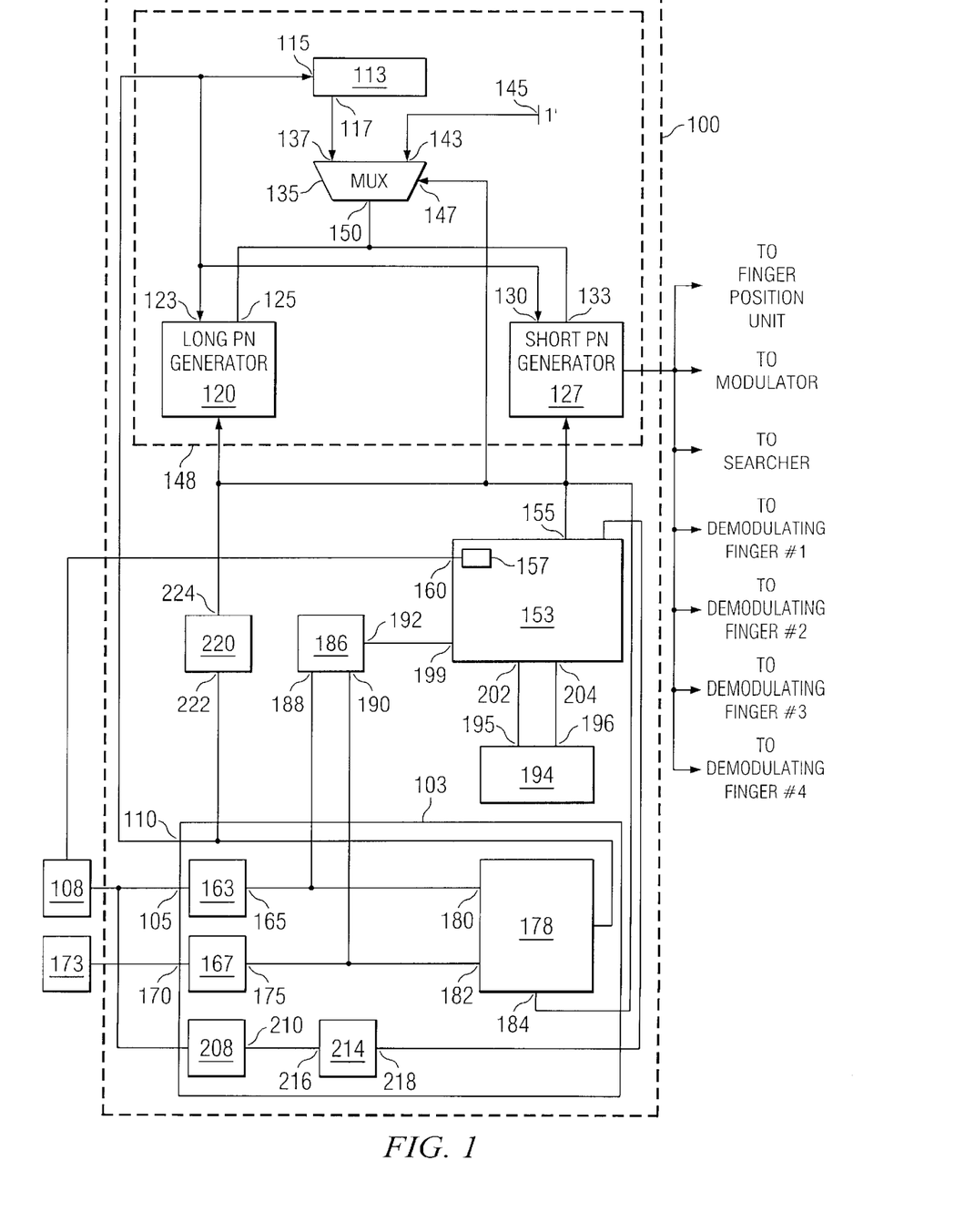
FIG. 1 is an integrated circuit device in its operative environment in accordance with illustrative embodiments of the invention.

FIG. 1 illustrates an integrated circuit device 100 according to an illustrative embodiment of the invention. The device maintains time synchronous with a CDMA network time. Device 100 includes a clock generator 103 having a primary input 105 for coupling to a primary reference frequency source 108 that produces a primary reference frequency signal, and an output 110. The output 110 produces a primary digital transceiver clock signal having a frequency of chiprate(S)(n) in a primary mode, and a secondary digital transceiver clock signal having a frequency of chiprate in a secondary mode. The frequency of the reference frequency signal can be any frequency that can be used to produce a signal having a frequency of chiprate(S)(n). Preferably the frequency of the primary reference frequency source is 19.68 MHz. Preferably the primary reference frequency source is a voltage controlled, temperature compensated crystal oscillator (VCTCXO). Alternatively, the primary reference frequency source is a voltage controlled crystal oscillator (VCXO).

The device also includes a chiprate divider 113 having an input 115 coupled to the output 110 of the clock generator and an output 117 producing a primary mode enable signal having a frequency of chiprate when in a primary mode. Preferably, the chiprate divider produces signals at the output of the chiprate divider that have a frequency that is $\frac{1}{16}$, $\frac{1}{8}$, $\frac{1}{24}$, or $\frac{1}{32}$ the frequency of signals coupled to the input of the chiprate divider.

The device also includes a long PN generator 120 having a clock input 123 and an enable input 125, the clock input being coupled to the output of the clock generator. The device also includes a short PN generator 127 having a clock input 130 and an enable input 133, the clock input being coupled to the output of the clock generator. Preferably the long PN generator is a 42 bit long PN sequence linear finite shift register (LFSR). The short PN generator can be, for example, is a 15 bit short PN index counter, or a 15 bit short PN sequence linear finite shift register (LFSR). The long PN generator and the short PN generator together may be referred to as the master timer. The long PN generator has a contol port 128 and the short PN generator has a control port 129 communicating with the controller, for example to receive timing advance and retard commands, and other control commands.

The device also includes a first multiplexer 135 having a first input 137 coupled to the output of the chiprate divider, a second input 143 coupled to an output 145 providing a secondary mode enable signal. The first multiplexer also has a control input 147, and an output 150 coupled to the enable input 125 of the long PN generator and to the enable input 130 of the short PN generator.

The device also includes a controller 153 having a multiplexer control output 155 coupled to the control input 147 of the first multiplexer. The controller produces a first control signal at the multiplexer control output causing the primary mode enable signal to be produced at the output of the first multiplexer in a primary mode. The controller also produces a second control signal at the multiplexer control output for causing the secondary mode enable signal to be produced at the output of the first multiplexer in a secondary mode. The multiplexer control output is a multipurpose bus for sending and receiving control signals to and from varous components. The components enclosed in box 148 can be referred to as the master timer.

B. First Alternative Embodiment

Preferably, the controller includes an automatic frequency controlled loop (AFC) 157 having an output 160. Preferably, the clock controller also includes a primary digital transceiver clock generator 163 having an input 105 which is the primary input of the clock generator, and an output 165. The output of the primary digital transceiver clock generator produces a primary digital transceiver clock signal having a frequency of chiprate(S)(n), with S and n being positive integers. Preferably S is a number selected from the group consisting of 4, 8, and 16, and n is a number selected from the group consisting of 1, 2, 3, 4, and 6. More preferably, S=8 and n=2.

Preferably the primary digital transceiver clock generator is a pulse swallower. The pulse swallower eliminates N−M of every N pulses from the reference frequency signal coupled to the input of the pulse swallower, with N and M being integers, and with N≧M. Consequently, the pulse swallower can be configured to remove any number of pulses, and preferably the number of pulses to be removed is programmable. Pulse swallowers are known in the art and can be implemented, for example, as a finite state machine, such as a counter that triggers a gate to bypass one or more pulses when the counter reaches its terminal value. When the frequency of the reference frequency signal is 19.68 MHz and the primary digital transceiver clock signal is 19.6608 MHz, preferably the pulse swallower eliminates one out of every 1025 pulses. When the frequency of the reference frequency signal is 19.68 MHz and the primary digital transceiver clock signal is chiprate(8), preferably the pulse swallower eliminates 513 out of every 1025 pulses. When the frequency of the reference frequency signal is 19.8 MHz and the primary digital transceiver clock signal is chiprate (16), preferably the pulse swallower eliminates 29 out of every 4125 pulses. When the frequency of the reference frequency signal is 19.8 MHz and the primary digital transceiver clock signal is chiprate(8), preferably the pulse swallower eliminates 2077 out of every 4125 pulses.

Preferably, the clock generator also includes an alternate source divider 167 having an input 170 which is a secondary input of the clock generator for coupling to a secondary reference frequency source 173. The alternate source divider also has an output 175. The output of the alternate source divider produces a secondary digital transceiver clock signal having a frequency substantially equal to the chiprate. The secondary reference frequency souce is an oscillator, an preferably is a low cost uncontrolled uncompensated crystal oscillator.

Preferably, the clock generator also includes a second multiplexer 178 having a first input 180, a second input 182, an output 110, and a control input 184. The first input of the second multiplexer is coupled to the output 165 of the primary digital transceiver clock generator, and the second input of the second multiplexer is coupled to the output 175 of the alternate source divider. The output 110 of the second multiplexer is the output of the clock generator.

Preferably, the multiplexer control output 155 of the controller is coupled to the control input 184 of the second multiplexer. The controller produces the first control signal at the control output to cause the primary digital transceiver clock signal to be produced at the output of the second multiplexer in the primary mode. The controller produces the second control signal at the control output to cause the secondary digital transceiver clock signal to be produced at the output of the second multiplexer in the secondary mode.

Preferably, the device also includes a clock calibrator 186 having a first input 188 coupled to the output of the primary digital transceiver clock generator, a second input 190 coupled to the output of the alternate source divider, and a bus having an output 192 producing a signal indicating the frequency difference between 1/(S)(n) times the frequency of the primary digital transceiver clock signal and the frequency of the secondary digital transceiver clock signal as a function of time.

Preferably, the device also includes a secondary mode timer 194 having an input 195, and an output 196 that produces a signal indicating the amount of time that the secondary mode is in effect.

Preferably, the controller also includes a calibrator input 199 coupled to the output of the clock calibrator. Preferably the controller also includes a timer output 202 coupled to the input 195 of the secondary mode timer for communicating secondary mode time information to the secondary mode timer, and a timer input 204 coupled to the output 196 of the secondary mode timer for receiving time information. Preferably, the controller is configured to calculate the cumulative frequency error during the time that the secondary mode is in effect. Preferably the controller also includes a master timer adjustment output 206 producing a signal for advancing or retarding a master timer to reduce the frequency error between the long PN generator and the short PN generator and the CDMA network time.

The integrated circuit device may also include a PLL 208 having an output 210, and an input 212 for coupling to the primary reference frequency source 108. The integrated circuit device may also include a clock divider 214 having an input 216 and at least one output 218, with the input of the clock divider being coupled to the output of the PLL.

Each output of the clock divider produces an additional clock signal, which may be connected, for example, to the controller and/or to peripheral devices such as a keyboard and display.

The device preferably also includes a digital transceiver 220 having a clock input 222 coupled to the output 110 of the clock generator, and a control bus port 224 coupled to the controller.

C. Second Alternative Embodiment

Figure 2:
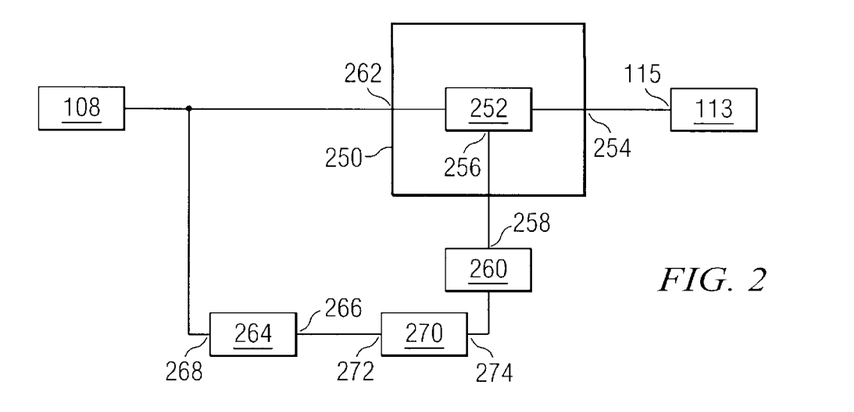
FIG. 2 illustrates a clock generator and related components in accordance with an alternative embodiment of the invention.

In an alternative embodiment illustrated in FIG. 2, the clock generator 250 includes a pulse swallower 252 having an output 254 which is the output of the clock generator, a control input 256 coupled to a pulse swallower control output 258 of the controller 260, and an input 262 which is the primary input of the clock generator. The input of the pulse swallower is for coupling to a primary reference frequency source 108. Preferably the primary reference frequency source is a VCTCXO. Alternatively, the primary reference frequency source is a VCXO. The output of the pulse swallower is coupled to the input 115 of the chiprate divider 113. In this embodiment, the pulse swallower eliminates J of every N pulses in response to receiving the first control signal at the control input in a primary mode, the pulse swallower eliminating K of every N pulses in response to receiving the second control signal at the control input in a secondary mode, wherein K>J.

Preferably, S and n are positive integers and S is a number selected from the group consisting of 4, 8, and 16, and n is a number selected from the group consisting of 1, 2, 3, 4, and 6. More preferably, S=8 and n=2.

Preferably, the pulse swallower eliminates one out of every 1025 pulses, or 513 out of every 1025 pulses, or 29 out of every 4125 pulses, or 2077 out of every 4125 pulses, in response to receiving the first control signal at the control input of the pulse swallower in the primary mode.

Preferably the pulse swallower eliminates 961 out of every 1025 pulses, or 993 out of every 1025 pulses, or 3869 out of every 4125 pulses, or 3997 out of every 4125 pulses in response to receiving the second control signal at the control input of the pulse swallower in the secondary mode.

The integrated circuit device may also include a PLL 264 having an output 266, and an input 268 for coupling to the primary reference frequency source 108. The integrated circuit device may also include a clock divider 270 having an input 272 and at least one output 274, with the input of the clock divider being coupled to the output of the PLL. Each output of the clock divider produces an additional clock signal, which may be connected, for example, to the controller and/or to peripheral devices such as a keyboard and display.

C. Third Alternative Embodiment

Figure 3:
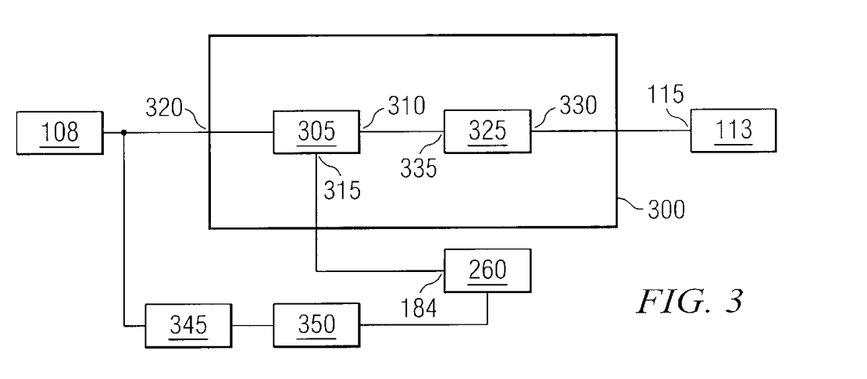
FIG. 3 illustrates a clock generator and related components in accordance with an alternative embodiment of the invention.

In an alternative embodiment illustrated in FIG. 3, the clock generator 300 includes a a programmable divider 305 having an output 310, a control input 315 coupled to the multiplexer control output of the controller, and an input 320. In this embodiment the input of the programmable divider is the primary input of the clock generator. The input of the programmable divider is for coupling to a primary reference frequency source 108. Preferably the primary reference frequency source is a VCTCXO. Alternatively, the primary reference frequency source is a VCXO. The programmable divider divides by one in response to receiving the first control signal at the control input in a primary mode, and the programmable divider divides by a predetermined number greater than one in response to receiving a second control signal at the control input in a secondary mode. Preferably the predetermined number is 16.

The clock generator also includes a pulse swallower 325 having an output 330, and an input 335 coupled to the output 310 of the programmable divider. The output of the pulse swallower is coupled to the input 115 of the chiprate divider 113. In this embodiment, the pulse swallower eliminates a fixed number J of pulses from every N pulses both when in the primary mode and when in the secondary mode. Preferably, J=1 and N=1025, or J=513 and N=1025, or J=29 and N=4125, or J=2077 and N=4125. The integrated circuit device may also include a PLL 345 and a clock divider 350 as described above for the preceding embodiment.

D. Fourth Alternative Embodiment

Figure 4:
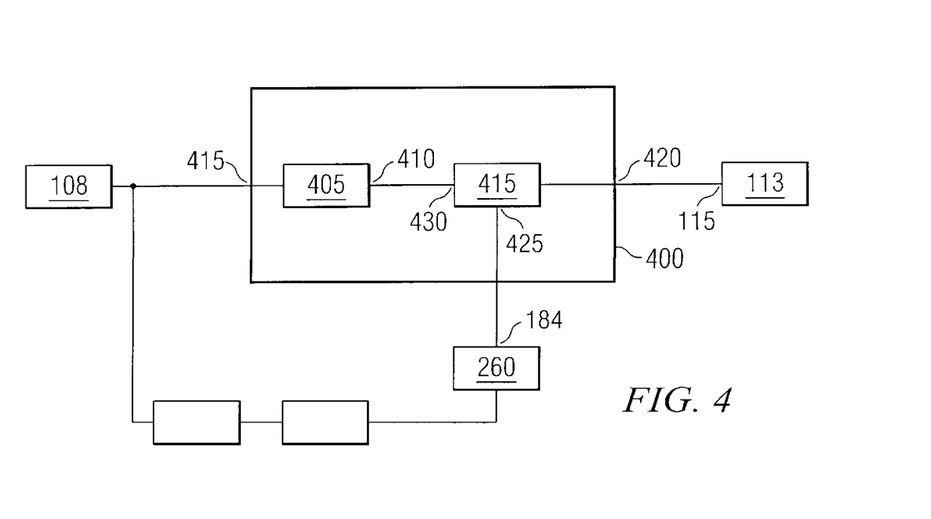
FIG. 4 illustrates a clock generator and related components in accordance with an alternative embodiment of the invention.

In an alternative embodiment illustrated in FIG. 4, the clock generator 400 includes a pulse swallower 405 having an output 410, and an input 415 which is the primary input of the clock generator. The input of the pulse swallower is for coupling to a primary reference frequency source 108. Preferably the primary reference frequency source is a VCTCXO. In this embodiment the pulse swallower eliminates a fixed number J of pulses from every N pulses both when in the primary mode and when in the secondary mode.

The clock generator also includes a programmable divider 415 having an output 420 which is the output of the clock generator, a control input 425 coupled to the multiplexer control output 184 of the controller, and an input 430 coupled to the output of the pulse swallower. In this embodiment the programmable divider divides by one in response to receiving the first control signal at the control input in a primary mode, and the programmable divider divides by a predetermined number greater than one in response to receiving a second control signal at the control input in a secondary mode. The output of the programmable divider is coupled to the input 115 of the chiprate divider 113. Preferably the predetermined number is 16. Preferably, J=1 and N=1025, or J=513 and N=1025, or J=29 and N=4125, or J=2077 and N=4125. The integrated circuit device may also include a PLL 435 and a clock divider 440 as described above for the preceding embodiment.

E. Radiotelephone

Figure 5:
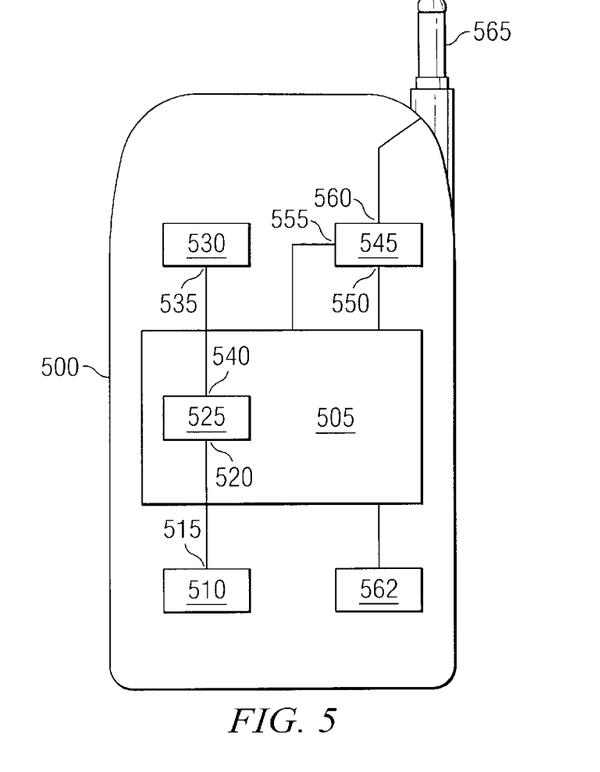
FIG. 5 is a radiotelephone in accordance with an illustrative embodiment of the invention.

FIG. 5 illustrates a radiotelephone 500 according to another illustrative embodiment of the invention. The radiotelephone includes an application specific integrated circuit (ASIC) 505 which includes a clock generator, a chiprate divider, a long PN generator, a short PN generator, a first multiplexer, a controller, a clock calibrator, a secondary mode timer, and wherein the controller includes a calibrator input, a timer input, and a master timer adjustment output, which are interconnected as described above with reference to FIG. 1. The clock generator includes a primary digital transceiver clock generator, an alternate source divider, and a second multiplexer which are also interconnected as described above with reference to FIG. 1. Thus, the ASIC in the radiotelephone is substantially the same as the integrated circuit device 100 shown in FIG. 1 and described above. The radiotelephone also includes a keypad 510 having an output 515 coupled to and input 520 of the controller 525, and a display 530 having an input 535 coupled to an output 540 of the controller. The radiotelephone further includes an analog transceiver 545 having an output 550 providing the data signals to the ASIC, an output 555 providing the external clock signal to the ASIC, an antenna input 560, and a VCTCXO 562 coupled to the ASIC 505. The radiotelephone additionally includes an antenna 565 coupled to the antenna input 560 of the analog transceiver.

F. Alternative Embodiment of Clock Generator

Figure 6:
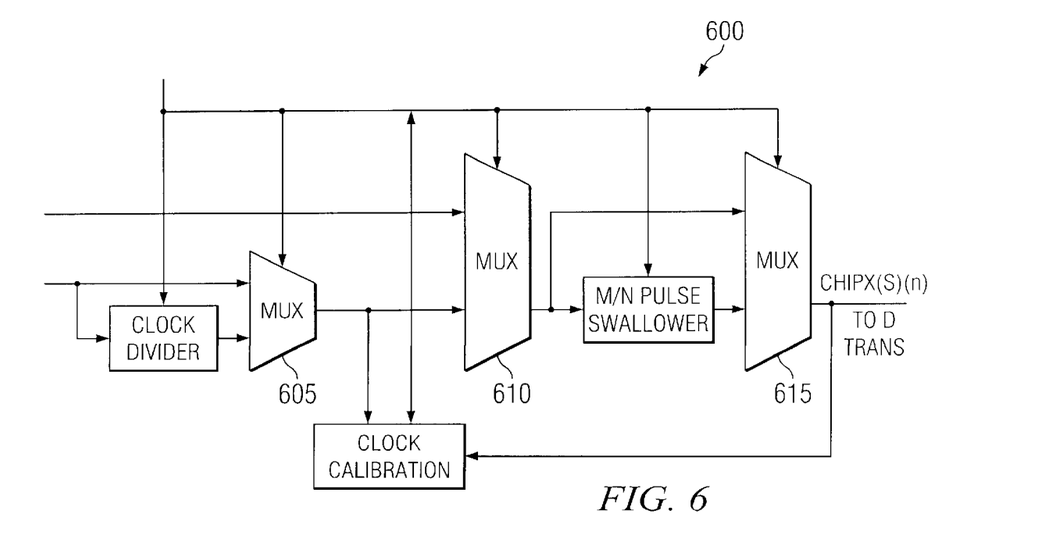
FIG. 6 is another embodiment of a clock generator in its operative environment in accordance with an illustrative embodiment of the invention.

Herein the phrase "coupled to" is defined to mean that an additional component or components can be interposed between a first element that is "coupled to" to a second element. Similarly, herein the phrase "for coupling" is defined to mean that an additional component or components can be interposed between a first element that is "for coupling" to an external output, input, port, or device. In other words, "coupled to" and "for coupling" are not limited to mean only direct connections with no interposed component or components. The interposed component or components can be any type of components, devices, or elements, for example, a multiplexer, a PLL, a clock divider, a pulse swallower, a logic gate, etc. FIG. 6 illustrates this concept by showing an alternative embodiment of a clock generator 600, employing multiplexers 605, 610, and 615 interposed between various elements of the clock generator.

G. Digital Transceiver

Figure 7:
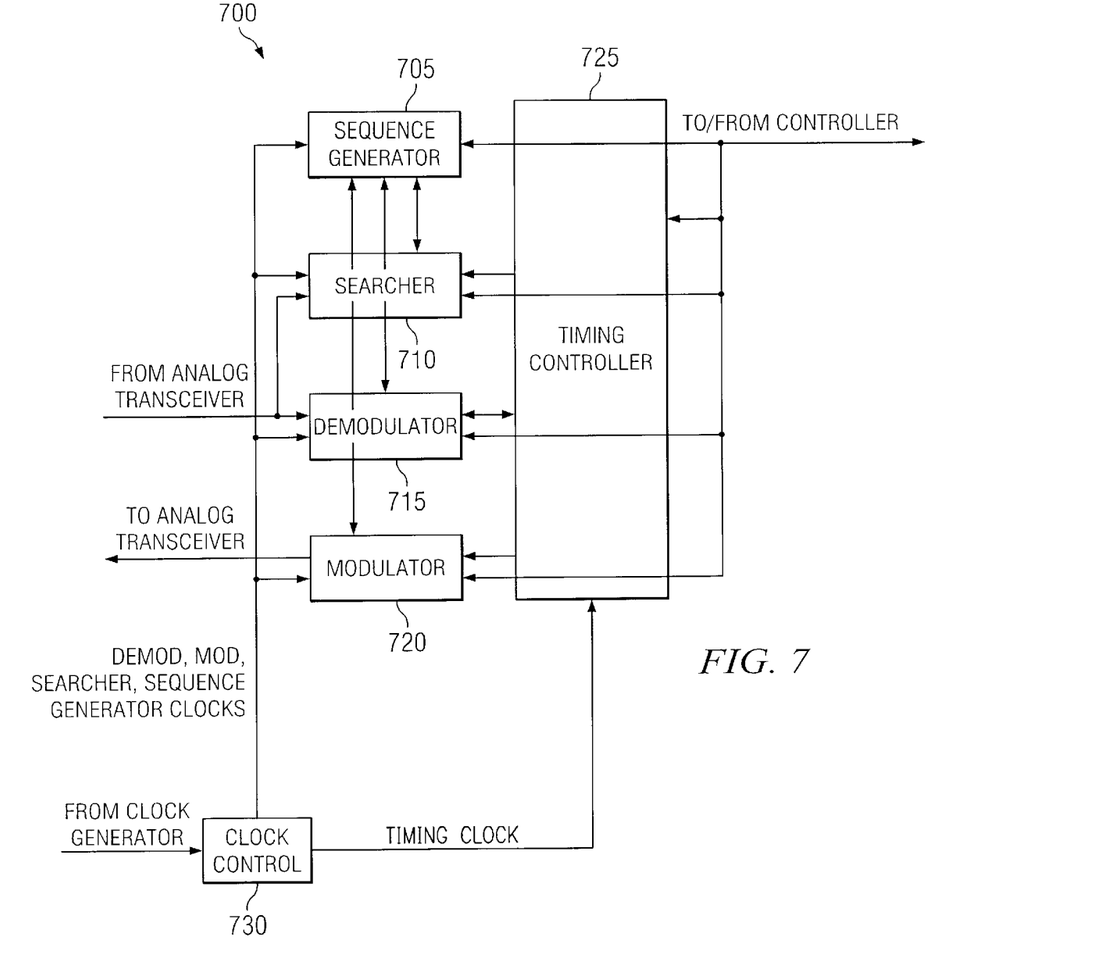
FIG. 7 is a block diagram of a digital transceiver in its operative environment in accordance with an illustrative embodiment of the invention.

FIG. 7 illustrates details of a digital transceiver 700 that may be used as the digital transceiver in an integrated circuit device in accordance with the invention. The main functional blocks of the digital transceiver are a sequence generator 705, a searcher 710, a demodulator 715, a modulator 720, a timing controller 725, and a clock control 730.

Methods

Additional aspects of the invention are embodied as methods. Although the methods may be practiced with any of a number of hardware configurations, for clarity of explanation, but with no limitation intended thereby, the tasks of the methods are described in the context of hardware embodiments of the invention described herein.

H. First Method for Maintaining Time Synchronous with a CDMA Network Time

A first method embodiment of the invention is a method for maintaining time synchronous with a CDMA network time. The tasks of this method are illustrated by the tasks of the flowchart 800 in FIGS. 8A–C.

Figure 8A:
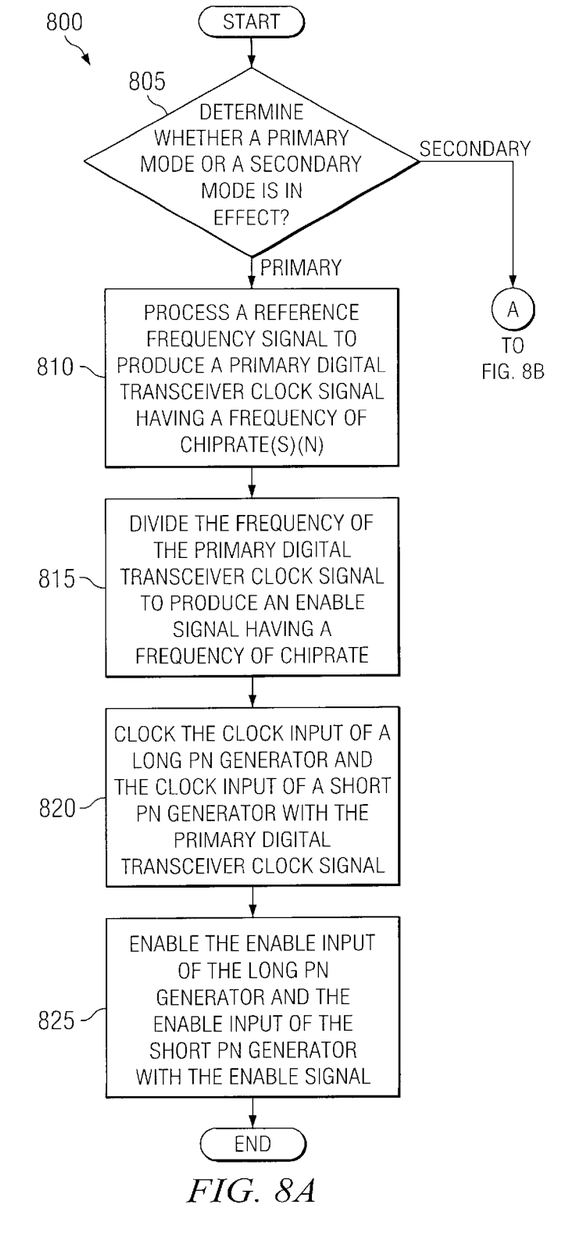
FIG. 8A is a flow chart of a method for maintaining time synchronous with a CDMA network time in accordance with an illustrative embodiment of the invention.

In task 805, it is determined whether a primary mode or a secondary mode is in effect. If it is determined that a primary mode is in effect, then the immediately following tasks are performed. In task 810 a reference frequency signal is processed to produce a primary digital transceiver clock signal having a frequency of chiprate(S)(n). Preferably, the reference frequency signal is produced by a VCTCXO. In task 815 the frequency of the primary digital transceiver clock signal is divided to produce an enable signal having a frequency of chiprate. In task 820, the clock input of a long PN generator and the clock input of a short PN generator are clocked with the primary digital transceiver clock signal. In task 825, the enable input of the long PN generator and the enable input of the short PN generator are enabled with the enable signal.

Figure 8B:
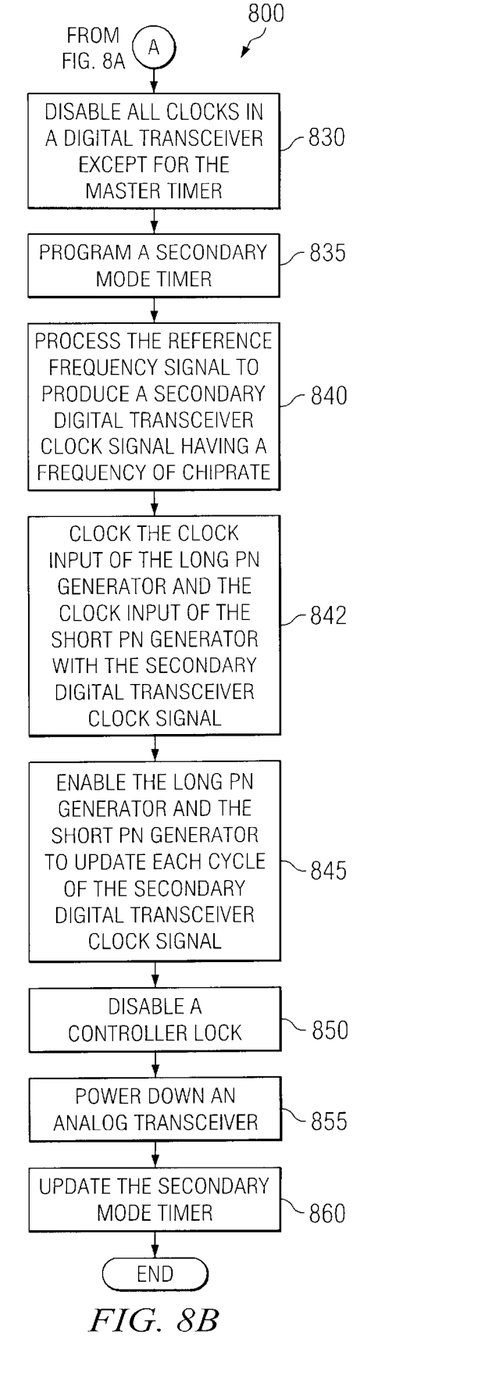
FIG. 8B is a continuation of FIG. 8A.

If it is determined that a secondary mode is in effect, then the immediately following tasks are performed. In task 830, all clocks in a digital transceiver are disabled except for the master timer. In task 835, a secondary mode timer is programmed. In task 840, the reference frequency signal is processed to produce a secondary digital transceiver clock signal having a frequency of chiprate. In task 842 the clock input of the long PN generator and the clock input of the short PN generator are clocked with the secondary digital transceiver clock signal. In task 845, the long PN generator and the short PN generator are enabled to update each cycle of the secondary digital transceiver clock signal. In task 850, a controller clock is disabled. In task 855, an analog transceiver is powered down. In task 860, the secondary mode timer is updated.

Generally, S and n are positive integers. Preferably S is a number selected from the group consisting of 4, 8, and 16, and n is a number selected from the group consisting of 1, 2, 3, 4, and 6. More preferably S=8 and n=2. Preferably, p is an integer selected from the group consisting of 1, 2, 3, 4, 6, and 8. More preferably, p is 2 or p is 4.

Generally, N–M of every N pulses can be eliminated, wherein N and M are integers, and N≧M. Different numbers of pulses will be eliminated depending on the frequency of the reference frequency source. For example, when a reference frequency signal having a frequency of 19.68 MHz is used, preferably one out of every 1025 pulses is eliminated from the reference frequency signal. The number of pulses eliminated for several other common reference frequency signal frequencies are: eliminate 513 out of every 1025 pulses; eliminate 29 out of every 4125 pulses; and, eliminate 2077 out of every 4125 pulses.

The task of processing the reference frequency signal to produce a primary digital transceiver clock signal having a frequency of chiprate(S)(n) may be implemented by eliminating pulses from the reference frequency signal. The task of processing the reference frequency signal to produce a secondary digital transceiver clock signal having a frequency of chiprate may be imlemented by eliminating pulses from the reference frequency signal.

The task of processing the reference frequency signal to produce a primary digital transceiver clock signal having a frequency of chiprate(S)(n) may be implemented by eliminating pulses from the frequency divided signal. The task of processing the reference frequency signal to produce a secondary digital transceiver clock signal having a frequency of chiprate may be implemented by dividing the frequency of the reference frequency signal by a number greater than one to produce a frequency divided signal and eliminating pulses from the frequency divided signal.

The task of processing the reference frequency signal to produce a primary digital transceiver clock signal having a frequency of chiprate(S)(n) may be implemented by eliminating pulses from the frequency divided signal to produce an intermediate signal. The task of processing the reference frequency signal to produce a secondary digital transceiver clock signal having a frequency of chiprate may be implemented by eliminating pulses from the frequency divided signal to produce an intermediate signal and dividing the frequency of the intermediate signal signal by a number greater than one.

The task of disabling all clocks in the digital transceiver may be implemented by disabling the demodulator, modulator, searcher, sequence generator, channel encoder, and the channel decoder.

Figure 8C:
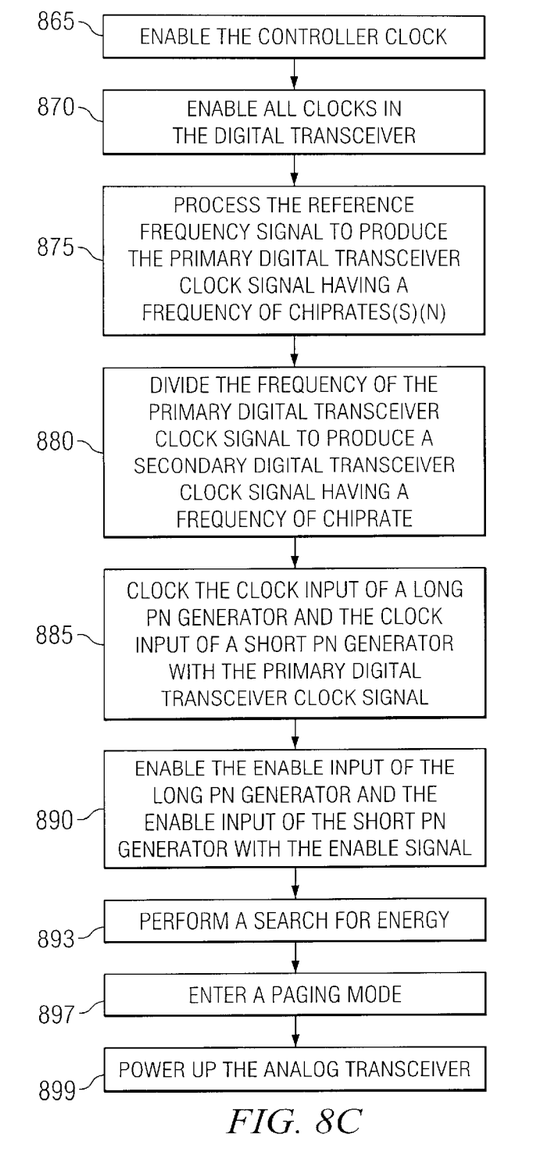
FIG. 8C is a flow chart showing optional additional steps of the method of FIGS. 8A and 8B.

Optionally, the method may include the following additional tasks: In task 865 the controller clock is enabled. In task 870 all clocks in the digital transceiver are enabled. In task 875, the reference frequency signal is processed to produce the primary digital transceiver clock signal having a frequency of chiprate(S)(n). In task 880, the frequency of the primary digital transceiver clock signal is divided to produce a secondary digital transceiver clock signal having a frequency of chiprate. In task 885, the clock input of a long PN generator and the clock input of a short PN generator are clocked with the primary digital transceiver clock signal. In task 890, the enable input of the long PN generator and the enable input of the short PN generator are enabled with the enable signal. In task 893, a search for energy is performed. In task 897, a paging mode is entered. Optionally, in task 899 the method also includes powering up the analog transceiver.

I. Second Method for Maintaining Time Synchronous with a CDMA Network Time

A second method embodiment of the invention is a method for maintaining time synchronous with a CDMA network time. The tasks of this method are illustrated by the tasks of the flowchart 900 in FIGS. 9A–C.

Figure 9A:
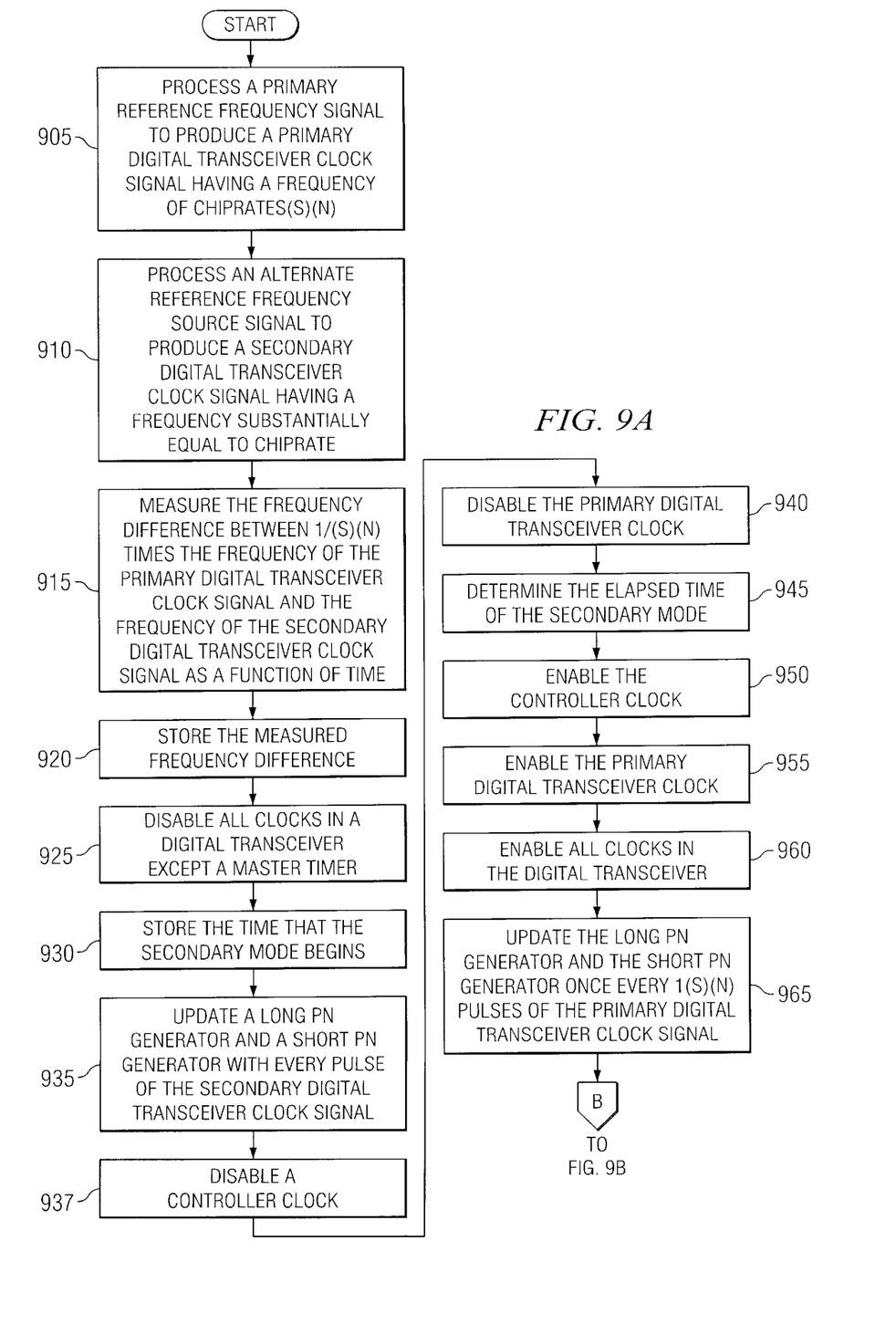
FIG. 9A is a flow chart of a method for maintaining time synchronous with a CDMA network time in accordance with an illustrative embodiment of the invention.

The method begins by initializing the system by performing the following tasks. Task 905 entail processing a primary reference frequency signal to produce a primary digital transceiver clock signal having a frequency of chiprate(S)(n). Task 910 entails processing an alternate reference frequency source signal to produce a secondary digital transceiver clock signal having a frequency substantially equal to chiprate. Task 915 entails measuring the frequency difference between $1/(S)(n)$ times the frequency of the primary digital transceiver clock signal and the frequency of the secondary digital transceiver clock signal as a function of time. Task 920 entails storing the measured frequency difference.

Figure 9B:
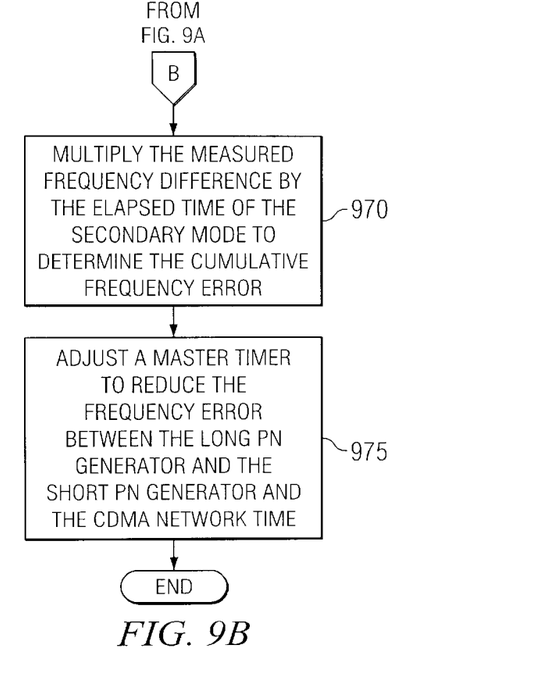
FIG. 9B is a continuation of FIG. 9A.

The method continues with entering a secondary mode by performing the following tasks. Task 925 entails disabling all clocks in a digital transceiver except a master timer. Task 930 entails storing the time that the secondary mode begins. Task 935 entails updating a long PN generator and a short PN generator with every pulse of the secondary digital transceiver clock signal. Task 937 entails disabling a controller clock. Task 940 entails disabling the primary digital transceiver clock.

The method continues with entering a primary mode by performing the following tasks. Task 945 entails determining the elapsed time of the secondary mode. Task 950 entails enabling the controller clock. Task 955 entails enabling the primary digital transceiver clock. Task 960 entails enabling all clocks in the digital transceiver. Task 965 entails updating the long PN generator and the short PN generator once every $1/(S)(n)$ pulses of the primary digital transceiver clock signal. Task 970 entails multiplying the measured frequency difference by the elapsed time of the secondary mode to determine the cumulative frequency error. Task 975 entails adjusting a master timer to reduce the frequency error between the long PN generator and the short PN generator and the CDMA network time.

Figure 9C:
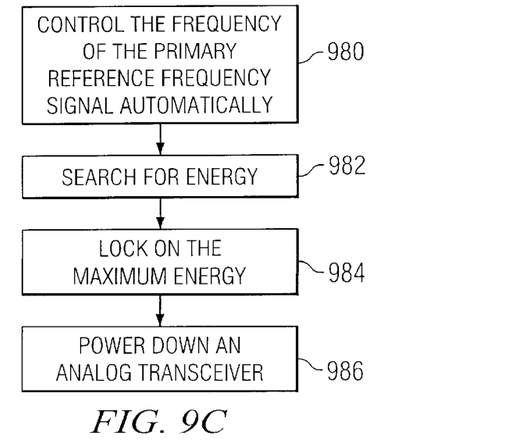
FIG. 9C is a flow chart showing optional additional steps of the method of FIG. 10.

Optionally, the method includes the following additional tasks. Task 980 entails controlling the frequency of the primary reference frequency signal automatically. Task 982 entails searching for energy. Task 984 entails locking on the maximum energy.

Optionally, the method also includes, in task 986, powering down an analog transceiver.

Generally, S and n are positive integers. Preferably S is a number selected from the group consisting of 4, 8, and 16, and n is a number selected from the group consisting of 1, 2, 3, 4, and 6. More preferably S=8 and n=2. Preferably, p is an integer selected from the group consisting of 1, 2, 3, 4, 6, and 8. More preferably, p is 2 or p is 4.

The task of processing a reference frequency signal to produce a primary digital transceiver clock signal having a frequency of chiprate(S)(n) may be implemented by eliminating pulses from the reference frequency signal. Generally, N–M of every N pulses can be eliminated, wherein N and M are integers, and N≧M. Different numbers of pulses will be eliminated depending on the frequency of the reference frequency source. For example, when a reference frequency signal having a frequency of 19.68 MHz is used, preferably one out of every 1025 pulses is eliminated from the reference frequency signal. The number of pulses eliminated for several other common reference frequency signal frequencies are: eliminate 513 out of every 1025 pulses; eliminate 29 out of every 4125 pulses; and, eliminate 2077 out of every 4125 pulses.

The task of processing the alternate reference frequency source signal to produce a secondary digital transceiver clock signal having a frequency substantially equal to chiprate may be implemented by dividing the frequency of the alternate reference frequency source signal by a rational number.

CONCLUSION

Although the invention has been described in the context of a CDMA cellular telecommunications network, the invention is not limited to CDMA systems, and is not limited to cellular system, but rather is applicable to any spread spectrum communications system.

Illustrative embodiments of the invention, including what are presently considered to be the preferred embodiments of the invention, have been described herein. It will be apparent to those skilled in the art that various changes and modifications can be made without departing from the scope of the invention as defined by the appended claims. Consequently, it is not intended that the invention should be limited to only the embodiments discussed above. Rather, the invention should be limited only by the scope of the claims.

What is claimed is:

1. An integrated circuit device for maintaining time synchronous with a CDMA network time, comprising:
    a clock generator having a primary input for coupling to a primary reference frequency source, and an output, the output producing a primary digital transceiver clock signal having a frequency of chiprate(S)(n) in a primary mode, and a secondary digital transceiver clock signal having a frequency of chiprate in a secondary mode;
    a chiprate divider having an input coupled to the output of the clock generator and an output producing a primary mode enable signal having a frequency of chiprate when in a primary mode;
    a long PN generator having a clock input and an enable input, the clock input being coupled to the output of the clock generator;
    a short PN generator having a clock input and an enable input, the clock input being coupled to the output of the clock generator;
    a first multiplexer having a first input coupled to the output of the chiprate divider, a second input coupled to an output providing a secondary mode enable signal, a control input, and an output coupled to the enable input of the long PN generator and to the enable input of the short PN generator; and
    a controller having a multiplexer control output coupled to the control input of the first multiplexer, the controller producing a first control signal at the control output for producing the primary mode enable signal at the output of the first multiplexer in a primary mode, the controller producing a second control signal at the control output for producing the secondary mode enable signal at the output of the first multiplexer in a secondary mode.

2. The integrated circuit device of claim 1 wherein the controller further comprises an automatic frequency controlled loop (AFC) having an output, and wherein the clock generator comprises:
    a primary digital transceiver clock generator having an input which is the primary input of the clock generator, and an output, the output producing a primary digital transceiver clock signal having a frequency of chiprate (S)(n);
    an alternate source divider having an input which is a secondary input of the clock generator for coupling to a secondary reference frequency source, and an output, the output of the alternate source divider producing a secondary digital transceiver clock signal having a frequency substantially equal to chiprate;
    a second multiplexer having a first input, a second input, an output, and a control input, the first input being coupled to the output of the primary digital transceiver clock generator, the second input being coupled to the output of the alternate source divider, the output of the second multiplexer being the output of the clock generator; and
    wherein the multiplexer control output of the controller is coupled to the control input of the second multiplexer, the controller producing the first control signal at the multiplexer control output for producing the primary digital transceiver clock signal at the output of the second multiplexer in the primary mode, the controller producing the second control signal at the multiplexer control output for producing the secondary digital transceiver clock signal at the output of the second multiplexer in the secondary mode.

3. The integrated circuit device of claim 2 further comprising:
    a clock calibrator having a first input coupled to the output of the primary digital transceiver clock generator, a second input coupled to the output of the alternate source divider, and a bus having an output producing a signal indicating the frequency difference between 1/(S)(n) times the frequency of the primary digital transceiver clock signal and the frequency of the secondary digital transceiver clock signal as a function of time;
    a secondary mode timer having an input and an output, the secondary mode timer output producing a signal indicating the amount of time that the secondary mode is in effect;
    the controller further comprising:
        a calibrator input coupled to the output of the clock calibrator;
        a timer output coupled to the input of the secondary mode timer for communicating secondary mode time information to the secondary mode timer;
        a timer input coupled to the output of the secondary mode timer for receiving time information, the controller being configured to calculate the cumulative frequency error during the time that the secondary mode is in effect; and
        a master timer adjustment output producing a signal for advancing or retarding a master timer to reduce the frequency error between the long PN generator and the short PN generator and the CDMA network time.

4. The integrated circuit device of claim 3 wherein the primary digital transceiver clock generator is a pulse swallower.

5. The integrated circuit device of claim 4 wherein S is a positive integer and wherein n is a positive integer.

6. The integrated circuit device of claim 4, wherein S is a number selected from the group consisting of 4, 8, and 16, and wherein n is a number selected from the group consisting of 1, 2, 3, 4, and 6.

7. The integrated circuit device of claim 4 wherein S=8 and n=2.

8. The integrated circuit device of claim 5 wherein:
the pulse swallower eliminates N–M of every N pulses;
N and M are integers; and
N≧M.

9. The integrated circuit device of claim 7 wherein the pulse swallower eliminates one out of every 1025 pulses.

10. The integrated circuit device of claim 5 wherein the pulse swallower eliminates 513 out of every 1025 pulses.

11. The integrated circuit device of claim 5 wherein the pulse swallower eliminates 29 out of every 4125 pulses.

12. The integrated circuit device of claim 5 wherein the pulse swallower eliminates 2,077 out of every 4125 pulses.

13. The integrated circuit device of claim 5 wherein the long PN generator is a 42 bit long PN sequence linear finite shift register (LFSR).

14. The integrated circuit device of claim 13 wherein the short PN generator is a 15 bit short PN index counter.

15. The integrated circuit device of claim 13 wherein the short PN generator is a 15 bit short PN sequence linear finite shift register (LFSR).

16. The integrated circuit device of claim 13 wherein the chiprate divider produces signals at the output of the chiprate divider that have a frequency that is 1/16 the frequency of signals coupled to the input of the chiprate divider.

17. The integrated circuit device of claim 13 wherein the chiprate divider produces signals at the output of the chiprate divider that have a frequency that is 1/8 the frequency of signals coupled to the input of the chiprate divider.

18. The integrated circuit device of claim 13 wherein the chiprate divider produces signals at the output of the chiprate divider that have a frequency that is 1/24 the frequency of signals coupled to the input of the chiprate divider.

19. The integrated circuit device of claim 13 wherein the chiprate divider produces signals at the output of the chiprate divider that have a frequency that is 1/32 the frequency of signals coupled to the input of the chiprate divider.

20. The integrated circuit device of claim 13 further comprising:
a PLL having an output, and an input for coupling to the output providing the reference frequency signal from the reference frequency source; and
a clock divider having an input and at least one output, the input of the clock divider being coupled to the output of the PLL, each output of the clock divider producing an additional clock signal.

21. The integrated circuit device of claim 20 wherein at least one output of the second clock divider is configured for connection to a controller.

22. The integrated circuit device of claim 21 wherein the primary reference frequency source is a VCTCXO and the secondary reference frequency source is an oscillator.

23. The integrated circuit device of claim 21 wherein the primary reference frequency source is a VCXO.

24. The integrated circuit device of claim 3 further comprising a digital transceiver having a clock input coupled to the output of the clock generator.

25. The integrated circuit device of claim 1 wherein the clock generator comprises:
a pulse swallower having an output which is the output of the clock generator, a control input coupled to a pulse swallower control output of the controller, and an input which is the primary input of the clock generator, the pulse swallower eliminating J of every N pulses in response to receiving the first control signal at the control input in a primary mode, the pulse swallower eliminating K of every N pulses in response to receiving the second control signal at the control input in a secondary mode, wherein K>J.

26. The integrated circuit device of claim 25 wherein S is a positive integer and wherein n is a positive integer.

27. The integrated circuit device of claim 25, wherein S is a number selected from the group consisting of 4, 8, and 16, and wherein n is a number selected from the group consisting of 1, 2, 3, 4, and 6.

28. The integrated circuit device of claim 25 wherein S=8 and n=2.

29. The integrated circuit device of claim 28 wherein the pulse swallower eliminates one out of every 1025 pulses in response to receiving the first control signal at the control input of the pulse swallower in the primary mode.

30. The integrated circuit device of claim 26 wherein the pulse swallower eliminates 513 out of every 1025 pulses in response to receiving the first control signal at the control input of the pulse swallower in the primary mode.

31. The integrated circuit device of claim 26 wherein the pulse swallower eliminates 29 out of every 4125 pulses in response to receiving the first control signal at the control input of the pulse swallower in the primary mode.

32. The integrated circuit device of claim 26 wherein the pulse swallower eliminates 2077 out of every 4125 pulses in response to receiving the first control signal at the control input of the pulse swallower in the primary mode.

33. The integrated circuit device of claim 26 wherein the pulse swallower eliminates 961 out of every 1025 pulses in response to receiving the second control signal at the control input of the pulse swallower in the secondary mode.

34. The integrated circuit device of claim 26 wherein the pulse swallower eliminates 993 out of every 1025 pulses in response to receiving the second control signal at the control input of the pulse swallower in the secondary mode.

35. The integrated circuit device of claim 26 wherein the pulse swallower eliminates 3869 out of every 4125 pulses in response to receiving the second control signal at the control input of the pulse swallower in the secondary mode.

36. The integrated circuit device of claim 26 wherein the pulse swallower eliminates 3997 out of every 4125 pulses in response to receiving the second control signal at the control input of the pulse swallower in the secondary mode.

37. The integrated circuit device of claim 26 further comprising:
a PLL having an output, and an input for coupling to the output of the primary reference frequency source; and
a clock divider having an input and at least one output, the input of the clock divider being coupled to the output of the PLL, each output of the clock divider producing an additional clock signal.

38. The integrated circuit device of claim 37 wherein at least one output of the second clock divider is configured for connection to a controller.

39. The integrated circuit device of claim 38 wherein the primary reference frequency source is a VCTCXO.

40. The integrated circuit device of claim 38 wherein the primary reference frequency source is a VCXO.

41. The integrated circuit device of claim 1 wherein the clock generator comprises:
   a programmable divider having an output, a control input coupled to the control output of the controller, and an input, the input of the programmable divider being the primary input of the clock generator, the programmable divider dividing by one in response to receiving the first control signal at the control input in a primary mode, the programmable divider dividing by a predetermined number greater than one in response to receiving a second control signal at the control input in a secondary mode; and
   a pulse swallower having an output, and an input coupled to the output of the programmable divider, the pulse swallower eliminating a fixed number J of pulses from every N pulses both when in the primary mode and when in the secondary mode.

42. The integrated circuit device of claim 41 wherein the predetermined number greater than one is 16.

43. The integrated circuit device of claim 42 wherein J=1 and N=1025.

44. The integrated circuit device of claim 42 wherein J=513 and N=1025.

45. The integrated circuit device of claim 42 wherein J=29 and N=4125.

46. The integrated circuit device of claim 42 wherein J=2077 and N=4125.

47. The integrated circuit device of claim 42 wherein the primary reference frequency source is a VCTCXO.

48. The integrated circuit device of claim 1 wherein the clock generator comprises:
   a pulse swallower having an output, and an input which is the primary input of the clock generator, the pulse swallower eliminating a fixed number J of pulses from every N pulses both when in the primary mode and when in the secondary mode; and
   a programmable divider having an output which is the output of the clock generator, a control input coupled to the control output of the controller, and an input coupled to the output of the pulse swallower, the programmable divider dividing by one in response to receiving the first control signal at the control input in a primary mode, the programmable divider dividing by a predetermined number greater than one in response to receiving a second control signal at the control input in a secondary mode.

49. The integrated circuit device of claim 48 wherein the predetermined number greater than one is 16.

50. The integrated circuit device of claim 49 wherein J=1 and N=1025.

51. The integrated circuit device of claim 49 wherein J=513 and N=1025.

52. The integrated circuit device of claim 49 wherein J=29 and N=4125.

53. The integrated circuit device of claim 49 wherein J=2077 and N=4125.

54. The integrated circuit device of claim 49 wherein the primary reference frequency source is a VCTCXO.

55. A radiotelephone for maintaining time synchronous with a CDMA network time, comprising:
   an ASIC comprising:
      a clock generator having a primary input for coupling to a primary reference frequency source, and an output, the output producing a primary digital transceiver clock signal having a frequency of chiprate (S)(n) in a primary mode, and a secondary digital transceiver clock signal having a frequency of chiprate in a secondary mode;
      a chiprate divider having an input coupled to the output of the clock generator and an output producing a primary mode enable signal having a frequency of chiprate when in a primary mode;
      a long PN generator having a clock input and an enable input, the clock input being coupled to the output of the clock generator;
      a short PN generator having a clock input and an enable input, the clock input being coupled to the output of the clock generator;
      a first multiplexer having a first input coupled to the output of the chiprate divider, a second input coupled to an output providing a secondary mode enable signal, a control input, and an output coupled to the enable input of the long PN generator and to the enable input of the short PN generator; and
      a controller having a control output coupled to the control input of the first multiplexer, the controller producing a first control signal at the control output for producing the primary mode enable signal at the output of the first multiplexer in a primary mode, the controller producing a second control signal at the control output for producing the secondary mode enable signal at the output of the first multiplexer in a secondary mode; and
   a keypad having an output coupled to an input of the controller;
   a display having an input coupled to an output of the controller;
   an analog transceiver having an output providing the data signals, an output providing the external clock signal, and an antenna input;
   an antenna coupled to the antenna input of the analog transceiver; and
   a VCTCXO.

56. The mobile telephone of claim 55 wherein the controller further comprises an automatic frequency controlled loop (AFC) having an output, and wherein the clock generator comprises:
   a primary digital transceiver clock generator having an input which is the primary input of the clock generator, and an output, the output producing a primary digital transceiver clock signal having a frequency of chiprate (S)(n);
   a alternate source divider having an input which is a secondary input of the clock generator for coupling to a secondary reference frequency source, and an output, the output of the alternate source divider producing a secondary digital transceiver clock signal having a frequency substantially equal to chiprate;
   a second multiplexer having a first input, a second input, an output, and a control input, the first input being coupled to the output of the primary digital transceiver clock generator, the second input being coupled to the output of the alternate source divider, the output of the second multiplexer being the output of the clock generator; and
   wherein the control output of the controller is coupled to the control input of the second multiplexer, the controller producing the first control signal at the control output for producing the primary digital transceiver clock signal at the output of the second multiplexer in the primary mode, the controller producing the second control signal at the control output for producing the secondary digital transceiver clock signal at the output of the second multiplexer in the secondary mode.

57. The mobile telephone of claim 56, the ASIC further comprising:
a clock calibrator having a first input coupled to the output of the primary digital transceiver clock generator, a second input coupled to the output of the alternate source divider, and a bus having an output producing a signal indicating the frequency difference between 1/(S)(n) times the frequency of the primary digital transceiver clock signal and the frequency of the secondary digital transceiver clock signal as a function of time;
a secondary mode timer having an output, the secondary mode timer output producing a signal indicating the amount of time that the secondary mode is in effect;
the controller further comprising:
   a calibrator input coupled to the output of the clock calibrator;
   a timer output coupled to the input of the secondary mode timer for communicating secondary mode time information to the secondary mode timer;
   a timer input coupled to the output of the secondary mode timer for receiving time information, the controller being configured to calculate the cumulative frequency error during the time that the secondary mode is in effect; and
a master timer adjustment output producing a signal for advancing or retarding a master timer to reduce the frequency error between the long PN generator and the short PN generator and the CDMA network time.

58. A method for maintaining time synchronous with a CDMA network time, comprising:
determining whether a primary mode or a secondary mode is in effect; and
if it is determined that a primary mode is in effect, further comprising:
   processing a reference frequency signal to produce a primary digital transceiver clock signal having a frequency of chiprate(S)(n);
   dividing the frequency of the primary digital transceiver clock signal to produce an enable signal having a frequency of chiprate;
   clocking the clock input of a long PN generator and the clock input of a short PN generator with the primary digital transceiver clock signal; and
   enabling the enable input of the long PN generator and the enable input of the short PN generator with the enable signal; and
if it is determined that a secondary mode is in effect, further comprising:
   disabling all clocks in a digital transceiver except for the master timer;
   programming a secondary mode timer;
   processing the reference frequency signal to produce a secondary digital transceiver clock signal having a frequency of chiprate;
   clocking the clock input of the long PN generator and the clock input of the short PN generator with the secondary digital transceiver clock signal;
   enabling the long PN generator and the short PN generator to update each cycle of the secondary digital transceiver clock signal;
   disabling a controller clock;
   powering down an analog transceiver; and
   updating the secondary mode timer.

59. The method of claim 58 wherein S is a positive integer and wherein n is a positive integer.

60. The method of claim 58, wherein S is a number selected from the group consisting of 4, 8, and 16, and wherein n is a number selected from the group consisting of 1, 2, 3, 4, and 6.

61. The method of claim 58 wherein S=8 and n=2.

62. The method of claim 59 wherein processing the reference frequency signal to produce a primary digital transceiver clock signal having a frequency of chiprate(S)(n) comprises eliminating pulses from the reference frequency signal; and
wherein processing the reference frequency signal to produce a secondary digital transceiver clock signal having a frequency of chiprate comprises eliminating pulses from the reference frequency signal.

63. The method of claim 62 wherein N–M of every N pulses are eliminated to produce the primary digital transceiver clock signal, wherein N and M are integers, and N≧M.

64. The method of claim 62 wherein one out of every 1025 pulses is eliminated to produce the primary digital transceiver clock signal.

65. The method of claim 62 wherein 513 out of every 1025 pulses is eliminated to produce the primary digital transceiver clock signal.

66. The method of claim 62 wherein 29 out of every 4125 pulses is eliminated to produce the primary digital transceiver clock signal.

67. The method of claim 62 wherein 2077 out of every 4125 pulses is eliminated to produce the primary digital transceiver clock signal.

68. The method of claim 59 wherein processing the reference frequency signal to produce a primary digital transceiver clock signal having a frequency of chiprate(S)(n) comprises:
   eliminating pulses from the frequency divided signal; and
   wherein processing the reference frequency signal to produce a secondary digital transceiver clock signal having a frequency of chiprate comprises:
      dividing the frequency of the reference frequency signal by a number greater than one to produce a frequency divided signal; and
      eliminating pulses from the frequency divided signal.

69. The method of claim 59 wherein processing the reference frequency signal to produce a primary digital transceiver clock signal having a frequency of chiprate(S)(n) comprises:
   eliminating pulses from the frequency divided signal to produce an intermediate signal; and
   wherein processing the reference frequency signal to produce a secondary digital transceiver clock signal having a frequency of chiprate comprises:
      eliminating pulses from the frequency divided signal to produce an intermediate signal; and
      dividing the frequency of the intermediate signal signal by a number greater than one.

70. The method of claim 59 wherein disabling all clocks in the digital transceiver comprises disabling the demodulator, modulator, searcher, sequence generator, channel encoder, and the channel decoder.

71. The method of claim 70 further comprising powering up the analog transceiver.

72. The method of claim 71, further comprising:

enabling the controller clock;

enabling all clocks in the digital transceiver;

processing the reference frequency signal to produce the primary digital transceiver clock signal having a frequency of chiprate(S)(n);

dividing the frequency of the primary digital transceiver clock signal to produce a secondary digital transceiver clock signal having a frequency of chiprate;

clocking the clock input of a long PN generator and the clock input of a short PN generator with the primary digital transceiver clock signal;

enabling the enable input of the long PN generator and the enable input of the short PN generator with the enable signal;

correcting the master timing;

performing a search for energy; and entering a paging mode.

73. The method of claim 72 wherein the reference frequency signal is produced by a VCTCXO.

74. A method for maintaining time synchronous with a CDMA network time, comprising:

initializing the system by:
processing a primary reference frequency signal to produce a primary digital transceiver clock signal having a frequency of chiprate(S)(n);
processing an alternate reference frequency source signal to produce a secondary digital transceiver clock signal having a frequency substantially equal to chiprate;
measuring the frequency difference between 1/(S)(n) times the frequency of the primary digital transceiver clock signal and the frequency of the secondary digital transceiver clock signal as a function of time;
storing the measured frequency difference; and entering a secondary mode by:
disabling all clocks in a digital transceiver except a master timer;
storing the time that the secondary mode begins;
updating a long PN generator and a short PN generator with every pulse of the secondary digital transceiver clock signal;
disabling a controller clock;
disabling the primary digital transceiver clock; and entering a primary mode by:
enabling the controller clock;
determining the elapsed time of the secondary mode;
enabling the primary digital transceiver clock;
enabling all clocks in the digital transceiver;
updating the long PN generator and the short PN generator once every 1/(S)(n) pulses of the primary digital transceiver clock signal;
multiplying the measured frequency difference by the elapsed time of the secondary mode to determine the cumulative frequency error; and
adjusting a master timer to reduce the frequency error between the long PN generator and the short PN generator and the CDMA network time.

75. The method of claim 74 further comprising:

controlling the frequency of the primary reference frequency signal automatically;

searching for energy; and locking on the maximum energy.

76. The method of claim 75 wherein S is a positive integer and wherein n is a positive integer.

77. The method of claim 75, wherein S is a number selected from the group consisting of 4, 8, and 16, and wherein n is a number selected from the group consisting of 1, 2, 3, 4, and 6.

78. The method of claim 75 wherein S=8 and n=2.

79. The method of claim 76 wherein processing a reference frequency signal to produce a primary digital transceiver clock signal having a frequency of chiprate(S)(n) comprises eliminating pulses from the reference frequency signal.

80. The method of claim 79 wherein N–M of every N pulses are eliminated to produce the primary digital transceiver clock signal, wherein N and M are integers, and N≧M.

81. The method of claim 79 wherein one out of every 1025 pulses is eliminated to produce the primary digital transceiver clock signal.

82. The method of claim 79 wherein 513 out of every 1025 pulses is eliminated to produce the primary digital transceiver clock signal.

83. The method of claim 79 wherein 29 out of every 4125 pulses is eliminated to produce the primary digital transceiver clock signal.

84. The method of claim 79 wherein 2077 out of every 4125 pulses is eliminated to produce the primary digital transceiver clock signal.

85. The method of claim 80 wherein processing the alternate reference frequency source signal to produce a secondary digital transceiver clock signal having a frequency substantially equal to chiprate comprises dividing the frequency of the alternate reference frequency source signal by a rational number.

86. The method of claim 85 further comprising powering down an analog transceiver.

* * * * *